W. NERACHER.

COMBINED KEY AND KNOB-FASTENER.

No. 7,600. Reissued April 10, 1877.

*Witnesses*
M L Stull
L Mansfield

*Inventor*
Wm Neracher.
Per Burnley & Co
Attys

N. PETERS, PHOTO-LITHOGRAPHER, WASHINGTON, D. C.

UNITED STATES PATENT OFFICE.

WILLIAM NERACHER, OF CLEVELAND, OHIO, ASSIGNOR OF ONE-HALF INTEREST TO H. B. PIPER.

IMPROVEMENT IN COMBINED KEY AND KNOB FASTENER.

Specification forming part of Letters Patent No. 179,943, dated July 18, 1876; reissue No. 7,600, dated April 10, 1877; application filed September 25, 1876.

*To all whom it may concern:*

Be it known that I, WM. NERACHER, of Cleveland, in the county of Cuyahoga and State of Ohio, have invented new and useful Improvements in Key-Fasteners, of which the following is a description, reference being had to the accompanying drawing, making a part of this specification, in which—

Figure 1:
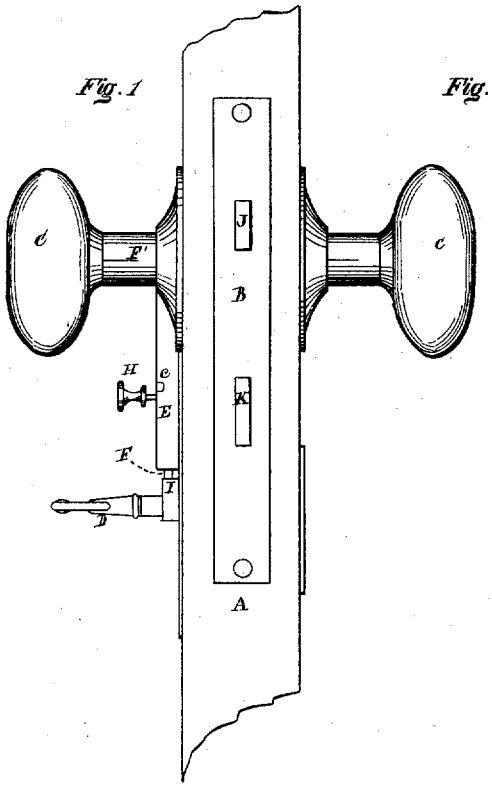
Figure 2:
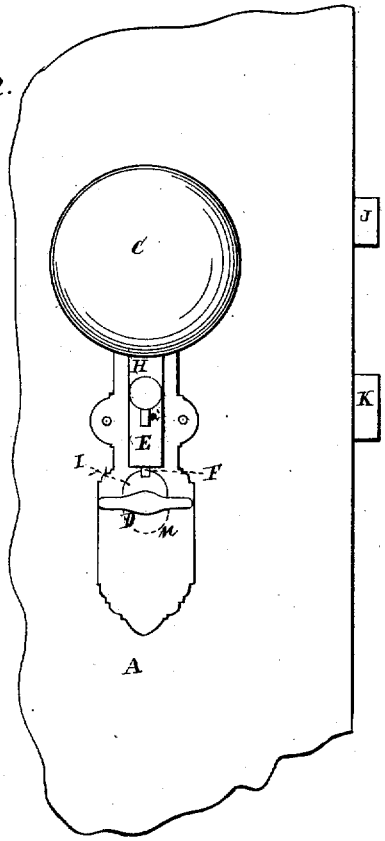
Figure 3:
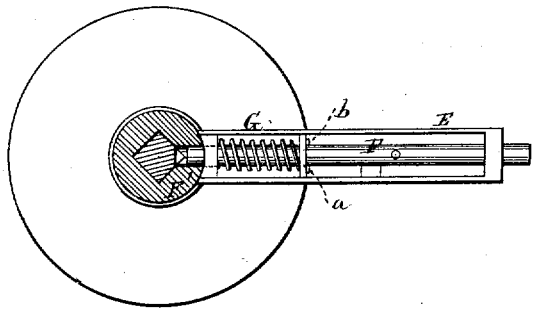

Figure 1 is an edge view of a door having applied thereto the key-fastener. Fig. 2 is a side view of the door. Fig. 3 is a detached section.

Like letters of reference refer to like parts in the several views.

This invention is a device for fastening a key in a door-lock, so that said key cannot be turned therein and pushed therefrom from the outside for the purpose of picking the lock to gain entrance to the room; also, by means of the same device the knob can be held from being turned while the lock-bolt may be free to be moved, thereby fastening the door without locking the same with the key; and, furthermore, both the key and knob may be fastened at the same time, and thus render doubly secure the door. For a full and correct understanding of the construction and operation of the invention reference will be had to the following description.

In the drawing, A represents a section of a door, of which K is the lock, C C the knobs, and D the key, all of which are or may be like such as are in ordinary use, except that the key is provided with a notched cam. E is a case secured to the inside face of the door, directly under the knob, as will be seen in the drawing. In said case is fitted a slide or bolt, F, Fig. 3, around the upper end of which is coiled a spring, G, between the collar *a* and the end of the case. The spring is retained in place by said collar and a pin, *b*. In the slide is secured the stem of a finger-piece, H, Fig. 1. The stem passes into the case through a slot, *a'*, wherein it slides, for actuating the slide F, as will be seen in Fig. 2.

On one side of the shank of the key is a projection or cam, I, at right angles to the bow thereof, as will be seen in Fig. 2. In the edge of said cam is a notch corresponding to the end of the slide F, and into which notch the end of the slide fits, as will be seen in Fig. 2.

The practical operation of the above-described key-fastener is as follows: On locking the door the key is left therein, and turned so as to bring the cam I upward under the slide F, the end of which will slip into the notch of the cam by the action of the spring G, as shown in Fig. 2. At the same time the cam forces the upper end of the slide F into the notch in the shank F' of the knob, thereby preventing the knob from being turned so as to retract the latch-bolt, thus doubly locking or fastening the door by both the latch and lock bolts.

In order to unlock the door the key must be turned in the lock. To this end the slide is pushed upward to disengage the lower end thereof from the key, which is then turned so as to bring the cam I to the under side, as indicate by dotted line *n*, Fig. 2. In this position of the key the slide is also disengaged from the shank F' of the knob, hence both latch-bolt and lock-bolt are free to be moved for opening the door.

Should it be necessary to fasten the door by the latch-bolt only, leaving the lock-bolt free, this may be done by pushing upward the slide so that the upper end thereof may enter the notch in the shank of the knob. This engagement of the slide with the shank is retained by the finger-piece H being pushed laterally into the notch *c*, Fig. 1, which will hold up the slide in its engagement with the notch, and prevent the knobs from being turned for moving the bolt, while the lock is free to be locked or unlocked without interfering with the latch-bolt now made fast by the slide.

On locking the door and adjusting the key, so as to bring the notch in the cam I under the slide, and allowing said slide to slip into the notch, the key will be fastened therein without unfastening the knob-bolt, both of which are secured by the slide, as shown in the drawing, thus doubly fastening the door, as aforesaid.

What I claim as my invention, and desire to secure by Letters Patent, is—

1. The case E, slide or bolt F, spring G, and finger-piece H, in combination with the key D, notched cam I thereof, and door A, in the manner substantially as described, and for the purpose specified.

2. In combination with the notched cam I of key D, and notched knob-shank F′, the slide F, spring G, case E, and notch *c*, for locking simultaneously the knob-shank and key, substantially in the manner as herein set forth, and for the purpose specified.

WM. NERACHER.

Witnesses:
J. W. BURBIDGE,
M. L. HULL.